United States Patent [19]
Gedon

[11] 4,390,183
[45] Jun. 28, 1983

[54] SMALL-SIZE DEVICE FOR SIMULATING A BRIDGE GAME

[76] Inventor: Catherine Gedon, 17 rue de Sèvres, 92100 Boulogne Billancourt, France

[21] Appl. No.: 324,176

[22] Filed: Nov. 23, 1981

[30] Foreign Application Priority Data

Nov. 24, 1980 [FR] France ................... 80 24898

[51] Int. Cl.³ .............................................. A63F 1/00
[52] U.S. Cl. .................................. 273/148 A; 273/295
[58] Field of Search ............... 273/148 R, 148 A, 293, 273/295, 309; 434/129

[56] References Cited

U.S. PATENT DOCUMENTS

| | | | |
|---|---|---|---|
| 1,726,115 | 8/1929 | Mugler | 273/148 R |
| 1,996,151 | 4/1935 | Gordon | 434/129 |
| 2,038,734 | 4/1936 | Hardy | 273/148 R UX |
| 2,481,709 | 9/1949 | Adams | 273/148 R X |
| 2,655,736 | 10/1953 | Lipschitz | 273/148 A X |

FOREIGN PATENT DOCUMENTS 315913 3/1934 Italy ................... 273/148 R

Primary Examiner—Anton O. Oechsle
Attorney, Agent, or Firm—William A. Drucker

[57] ABSTRACT

This device for simulating a bridge deal and the tricks accomplished during a a bridge game by means of movable blocks representing the hands and then the tricks comprises essentially a small game-board having cavities formed therein for receiving the movable blocks, each block having a visible face representing one of the 52 playing-cards; the cavities comprise a series of four grooves for inserting the blocks according to their specific suit, a series of four grooves for receiving the blocks corresponding to the cards of the four hands, and finally 13 rows of four cells each for receiving the blocks of the 13 tricks in four columns corresponding to the hands, from which the cards represented by the blocks are received.

8 Claims, 1 Drawing Figure

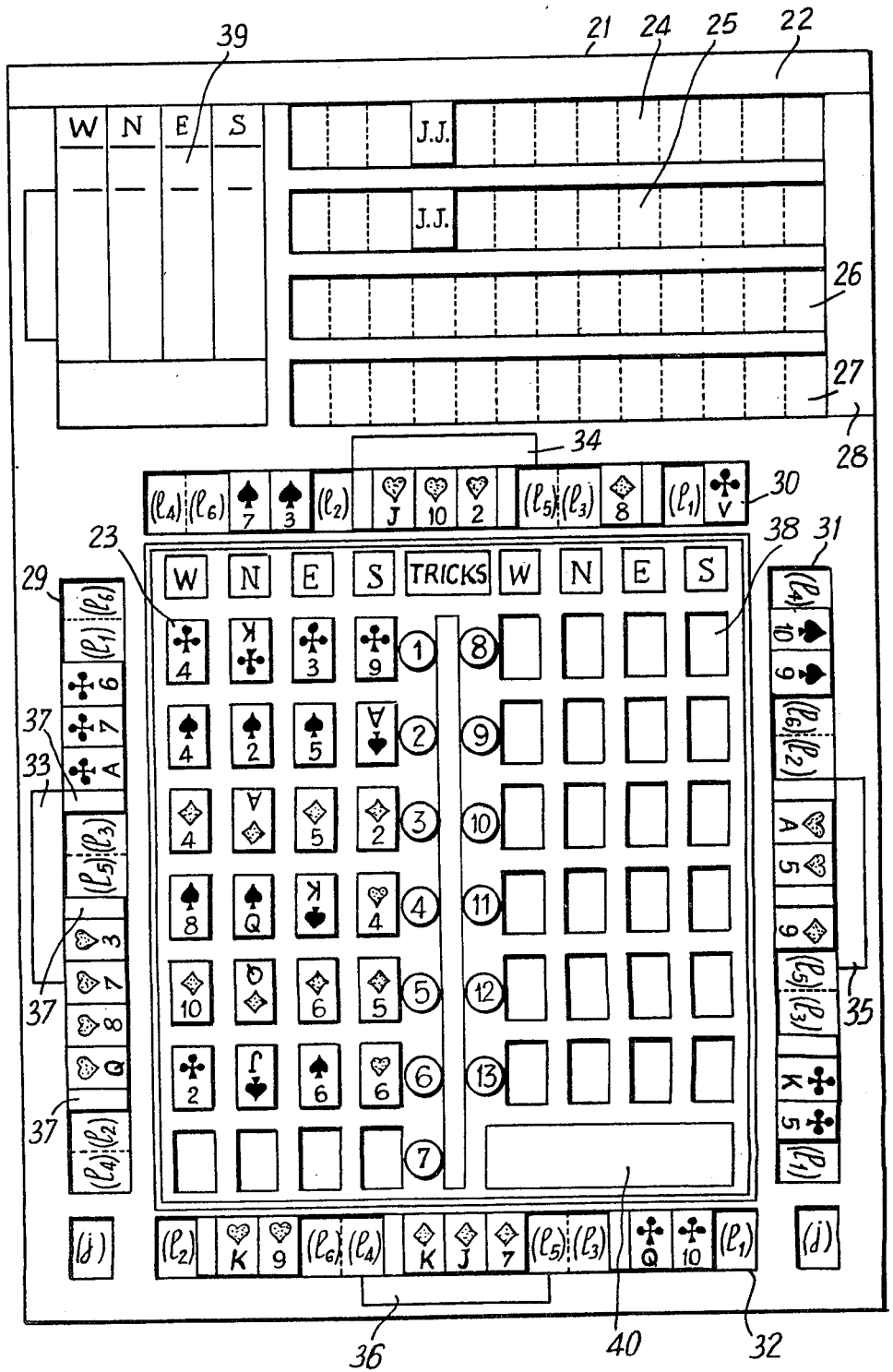

SMALL-SIZE DEVICE FOR SIMULATING A BRIDGE GAME

BACKGROUND OF THE INVENTION

This invention relates to a small-size device for simulating a bridge deal and displaying simultaneously the cards of the four players together with the tricks made in the order in which they took place while permitting the cancellation thereof in the reverse order for reverting to a prior condition for example with a view to attempt to do other tricks.

SUMMARY OF THE INVENTION

The device according to this invention is characterized essentially in that it comprises a small board in which rectangular cavities are formed for embedding therein small prismatic blocks representing the 52 playing cards and adapted to be arrayed either in four rows corresponding to the four suits or in four other rows disposed substantially along the sides of a square to represent a four-hand deal, or alternately inside this square in 13 four-position rows representing successively the 13 deals as they take place, the cards from a same hand lying in a same corresponding column in the 13 rows.

The use of small blocks adapted to be fitted in fixed positions in corresponding cavities or recesses for representing the game cards in their various situations is advantageous in that blocks having the simplest possible structure can be used while facilitating the fitting of said blocks in the desired positions and warranting a high degree of stability of the thus positioned blocks while protecting them from substantially any risks of undesired disarrangement, since no block is left free and can only change from one embedded position to another for distributing the cards among the players and making the tricks. On the other hand, this stability can be improved by providing in the cavities and on the blocks to be embedded therein faces adapted to be mutually attracted by magnetic force.

The above-mentioned blocks representing the 52 playing-cards of a game of bridge may for example be 2-cm thick, i.e. twice the depth of said cavities, and have a 15×12 millimeter surface area; though these dimensions are given by way of illustration, not by limitation, they appear to be particularly advantageous for conveniently assembly the three above-mentioned arrangements in a board having the standard 21×29.7-cm size of a paper sheet while reserving one portion of the board surface for inscribing the bids. The top face of each one of the 52 blocks represents one of the 52 cards.

DESCRIPTION OF THE PREFERRED EMBODIMENT

In order to afford a clearer understanding of the present invention a typical and preferred form of embodiment thereof will now be described with reference to the single FIGURE of the accompanying drawing which is a front view of the board carrying the blocks in the condition having developed after six tricks following a deal which could be reconstituted as it was in its initial condition.

Though the present invention is not limited to a specific choice of dimensions, the board 21 may for example have a flat face 22, with horizontal dimensions such as 29.7×21 cm, in which cavities having a depth of one cm are formed for receiving double-height blocks which will therefore protrude therefrom by half their height. This board may consist for example of wood or plastics, but if desired it may also comprise a metal frame structure, notably if a magnetic fixing thereof were contemplated. The blocks simulating the 52 cards may advantageously consist of straight prisms having a rectangular base with on their top surface a picture representing one of the 52 cards, the dimensions of this top surface being for example 15×10 mm.

These card-simulating blocks may be positioned either according to suits or according to deals by distributing the cards among the four hands, or alternately according to a trick position. In the order-setting positions the board illustrated comprises in its upper portion four successive grooves 24, 25, 26 and 27 having a depth of one centimeter, a length of 13 cm and a width of 15 cm, each groove being furthermore capable of receiving in side by side relationship 13 blocks of one of the four suits (spades, hearts, diamonds and clubs). A label 28 bearing the mention "Storage by suit" may be associated with each one of said four grooves. All the blocks of a same suit may be disposed in each one of the four grooves in the conventional suit order (such as Ace, King, Queen, Jack, 10, 9, . . . etc.). These four grooves constitute the first series of cavities comprising the setting cavities and the broken lines designate the separations between successive blocks to be set in each groove.

The second series of cavities comprises four similar grooves 29, 30, 31 and 32 constituting the deal or hand cavities which may be designated by labels 33, 34, 35 and 36 respectively, said labels bearing the inscriptions "West Deal", "North Deal", "East Deal" and "South Deal", respectively. These four grooves constitute the sides of a substantially square frame comprising in its inner space the trick cavities, as will be explained presently. The grooves 29 to 32 are 14.5-cm long and project beyond the length of grooves 24 to 27 by 15 mm so that they can receive, in addition to the 13 blocks corresponding to the player's hand, three half-width blocks, as shown at 37, each half-width block acting as a separator between two successive suits. These separators 37 are adapted to remain in a fixed position during the successive tricks, thus facilitating the partial or complete reconstitution of the initial deal for reverting to the beginning of the play by cancelling the last tricks.

The third series of cavities comprises separate cavities or cells 38 distributed among four columns of 13 rows of 4 cells each numbered 1 to 13 for receiving the blocks simulating the cards of the 13 successive tricks, each block being located in the column (W, N, E or S) corresponding to the Western, Northern, Eastern or Southern hand or deal respectively from which the corresponding card is received. To ensure a proper distribution of the cells, the first seven tricks may follow one after the other on the left-hand half of the trick board, as shown, and other six tricks succeeding on the right-hand half of the board. In the example illustrated in the drawing it is assumed that the first six tricks were such that the trick rows numbered 1 to 6 receive blocks corresponding to the cards of these particular tricks, while the cells of the other seven rows are empty.

The reference numeral 39 designates a board section in which the auction bids can be inscribed, another board section 40 being utilized for displaying the result.

It will be seen that due to the rectangular shape of the cavities and blocks the blocks can be fitted into their recesses in only two symmetrical positions so that it is possible to designate in the trick rows the winning card by inserting the latter upside down in the corresponding cavity, as shown in the case of trick 1 by the inverted position of the king of clubs, the drawing illustrating the position after the sixth trick of a deal which can be reconstituted by re-inserting the deal blocks into grooves 20 to 32. In order to afford a clearer understanding of this specific possibility, there is shown in the drawing, in each empty position of said grooves, at $1_1$, $1_2$, $1_3$, $1_4$, $1_5$ or $1_6$ the specific one of the six tricks which comprises the missing card corresponding to the empty position, whereby the corresponding block lies in the row of the thus designated trick and in the column corresponding to the hand concerned. Thus, for example, the empty square $1_1$ of groove 29 (West deal) contained initially the block fitted into the cell pertaining to row 1 and column 0, i.e. in the example illustrated to club 4.

From the foregoing it appears clearly not only that with the device of the present invention it is possible to display the development of a game following any deal, but also to come back by cancelling the last tricks and replacing the corresponding blocks into the grooves of hands 29 to 32.

The board can easily be transported while leaving the blocks in any desired positions for it is only necessary to fit on top of this board a cover adapted to be locked through any suitable means, notably by using an external strap, so that the inner face thereof bears flat against the blocks so as to maintain them in the cavities in which they were previously fitted.

It will readily occur to those conversant with the art that the exemplary form of embodiment described hereinabove and illustrated in the accompanying drawing should not be construed as limiting the scope of the invention, since various modifications and/or additions could be contemplated without departing from the basic principles of the invention as set forth in the appended claims. In the drawing, two additional cells (j) and (j) are shown in the lower corner of the board and adapted to receive two joker blocks bearing the letters J.J. on their top face. In the example illustrated, two such blocks are fitted in the jack positions of rows 24 and 25 but simply in order to illustrate the position of a block in grooves 24 and 27.

What I claim is:

1. A small-size device for simulating a bridge game, which comprises:
    a small board,
    means defining a first series of 52 cavities provided in said board, said first series of cavities being disposed according to four rows of thirteen cavities each, these rows being parallel to each other and in close relationship,
    means defining a second series of 52 cavities provided in said board, said second series of cavities comprising four rows of thirteen cavities each disposed along the outer periphery of a substantially square game area,
    a third series of 52 cavities provided in said board, said third series being disposed inside said square game area and comprising thirteen rows of four cavities each,
    and 52 blocks bearing the pictures of the various symbols of bridge playing cards, each one of said blocks having a prismatic configuration and being adapted to be partially embedded into any cavity of said first to third series of cavities,
    so that in said first defined series of cavities said blocks can be disposed according to their suits in a storage position, while in said second defined series of cavities said blocks can be disposed to display the four hands of any bridge deal and in said third series of cavities said blocks can be disposed to represent the thirteen tricks as they are accomplished.

2. Device according to claim 1, wherein said means defining said first series of storage cavities comprises four grooves each adapted to receive in side by side relationship the thirteen blocks representing the playing cards of a same suit.

3. Device according to claim 1, wherein said means defining said second series of cavities representing the deals of four players comprises for each deal a groove adapted to receive in side by side relationship the thirteen blocks representing the cards of a particular player.

4. Device according to claim 3, wherein the length of each deal groove is slightly longer than thirteen times the width of a single block to permit a complementary insertion into the same groove of three blocks without any picture which constitute separators disposed between the four suits.

5. Device according to claim 1, wherein said third series of cavities corresponding to the tricks comprises thirteen rows of four cavities each forming columns corresponding to the four deals for receiving in the proper order the blocks corresponding to the thirteen sequential deals, each block being inserted into the column corresponding to the deal from which the block concerned was extracted.

6. Device according to claim 5, wherein the trick cavities are divided into two groups of four columns each, disposed side by side, each group being adapted to contain the rows of six or seven tricks.

7. Device according to claim 1, wherein said blocks and the cavities receiving said blocks have registering surfaces kept in mutual contact by magnetic attraction.

8. Device according to claim 1, which comprises a cover adapted to be secured to said board by forming therewith a package retaining said blocks in their storage positions or in any positions corresponding to a predetermined game condition.

* * * * *